April 5, 1938.  W. H. HEWITT  2,113,448
TRAILER
Filed Dec. 16, 1936  2 Sheets-Sheet 1
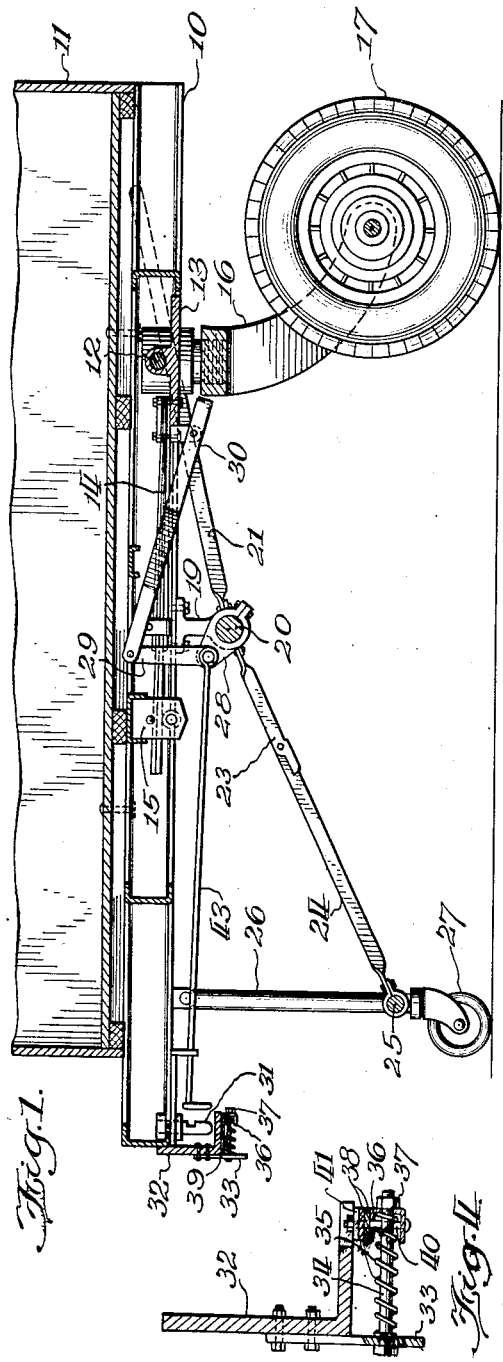
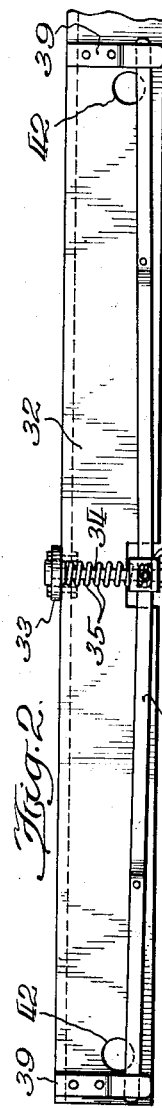
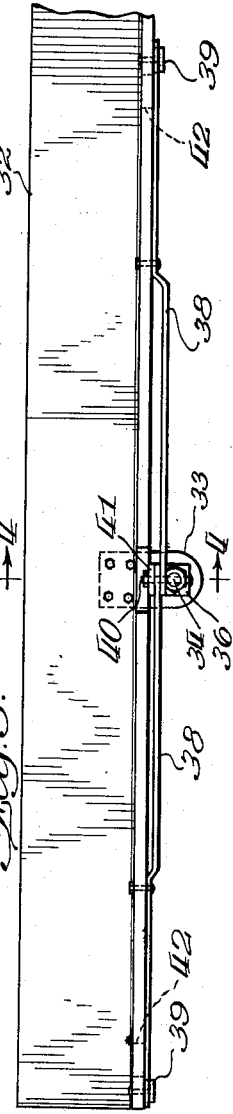
Inventor.
William H. Hewitt
By Williams, Bradbury,
McCaleb & Hinkle Attys April 5, 1938.  W. H. HEWITT  2,113,448
TRAILER
Filed Dec. 16, 1936  2 Sheets-Sheet 2

Inventor:
William H. Hewitt
By Williams, Bradbury, McCaleb & Hinkle
Attys.

Patented Apr. 5, 1938

2,113,448

UNITED STATES PATENT OFFICE 2,113,448

TRAILER

William H. Hewitt, Chicago, Ill., assignor to The Hewitt Delivery Systems, Inc., Boston, Mass., a corporation of Delaware Application December 16, 1936, Serial No. 116,137

7 Claims. (Cl. 280—33.4)

The invention relates to a novel construction for a trailer adapted to be attached to an automotive vehicle, such as a passenger automobile.

The trailer is preferably made less than half as wide as a standard automotive vehicle, so that the trailer is light enough to be moved about by hand and so that two of the trailers may be connected side by side, behind one automotive vehicle. When two of the trailers are so connected, side by side, each of the trailers is preferably hinged to the rear of the vehicle in such a manner that the trailer pivots about a transverse horizontal axis at the hinge. However, any arrangement may be employed that provides for pivoting of the trailers in a vertical plane while keeping the trailers parallel to one another. If the trailers swivel in a horizontal plane with respect to the vehicle to which they are secured, they should swivel together so that they remain parallel.

The principal object of the invention is to provide a trailer of simple and inexpensive construction that can be detached from the vehicle that transports it and moved about with ease.

More specific objects and advantages are apparent from the description, in which reference is had to the accompanying drawings illustrating a preferred embodiment of the invention.

Fig. 1 of the drawings is a vertical section of the lower portion of the trailer;

Fig. 2 is a bottom plan view of the bracket carried by the vehicle to which the trailer is attached;

Fig. 3 is a rear elevational view of the bracket;

Fig. 4 is a vertical section taken on the line 4—4 of Fig. 3;

Figure 5:
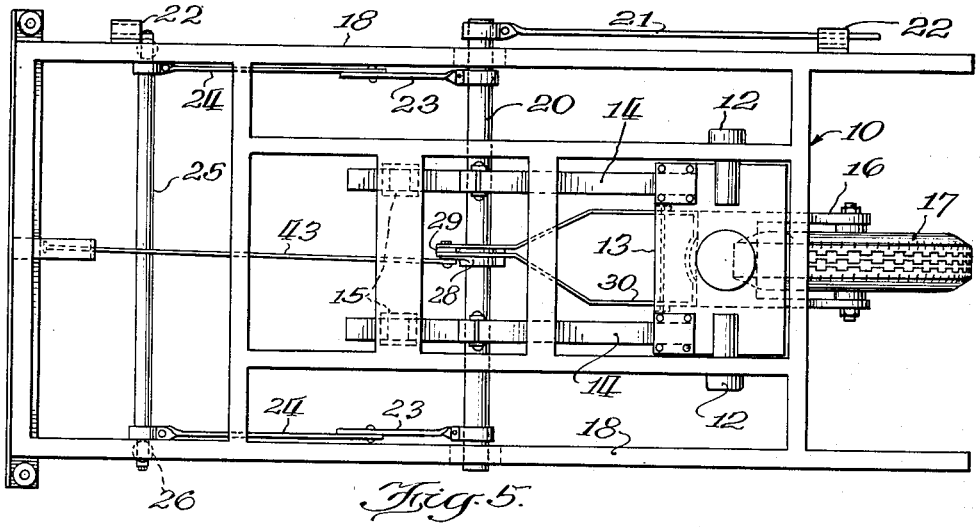
Fig. 5 is a plan of the trailer chassis.

These specific drawings and the specific description that follows merely disclose an illustrative embodiment of the invention, and are not to impose limitations upon the claims.

In the preferred construction a single swiveled wheel is provided for supporting the rear of the trailer, together with auxiliary front wheels to adapt the trailer to be moved about when it is detached from its vehicle, and a device for locking the single wheel against swiveling when the trailer is to be moved about.

The auxiliary front wheels are preferably mounted upon a frame that is hinged to the body of the trailer and folds up beneath it, and the device that locks the single wheel against swiveling may be actuated by the movement of the frame and wheels into supporting position.

When the trailer is being hauled by the vehicle, the front of the trailer may be supported by simply being mounted upon the rear of the vehicle. Then the construction may be such that when the frame and wheels are moved into supporting position they lift the body clear of the vehicle. The trailer illustrated in the drawings comprises a chassis frame 10, upon which the housing 11 of the trailer is mounted.

Fixed in the rear portion of the frame are a pair of trunnions 12, which rockably support a mounting plate 13. Two sets of leaf springs 14 have their rear ends secured to the mounting plate 13, and have their front ends slidably supported by brackets 15 secured to the central portion of the frame.

Depending from the mounting plate 13 and arranged to swivel with respect thereto is a yoke 16 in which the road wheel 17 is journaled. The construction is such that the road wheel is located as far toward the rear as it can be located without causing mud to be thrown up by the wheel against the back of the trailer. Any mud that is thrown up strikes the bottom of the trailer, where it is not visible.

Shocks transmitted to the yoke 16 are absorbed by the springs 14 that yieldably resist the rocking of the mounting plate 13 upon the trunnions 12.

Supported by the side members 18 of the frame 10 are a pair of hangers 19, in which is journaled a control shaft 20 that is actuated by means of a lever 21 movable between stops 22 on the frame.

Two arms 23 are fixed upon the control shaft 20, and each of them is articulated to a longer arm 24. Journaled in the lower ends of the longer arms 24 is the cross bar 25 of a U shaped frame 26 that is hinged to the bottom of the chassis frame and carries swiveled auxiliary wheels 27.

A crank 28 is fixed upon the control shaft 20. Pivoted to the crank is a link 29, which is articulated to the front end of a yoke 30 that is pivoted at an intermediate point to brackets depending from the mounting plate 13.

The latching devices that secure the front end of the frame upon the rear of the associated vehicle are a pair of lugs 31, having notches in their rear sides. The bracket 32, upon which the front of the chassis frame is supported, may be attached to a passenger vehicle in place of the usual rear bumper. Riveted to the front of the bracket 32, which is in the form of an angle, is a vertical plate 33, having an aperture through which the stem of a retaining pin 34 extends.

The pin 34 is surrounded by a spring 35 that urges the pin toward the rear and bears against the bottom of a U-shaped bracket 36 that is held upon the end of the pin by a nut 37. A pair of latch bars 38 are pivoted at intermediate points to the bottom of the angle bracket 32 and have their free ends held against the bottom of the bracket by means of guides 39. They have their inner ends pivoted to the U-shaped bracket 36 by means of a pin 40 that passes down through a spacer 41, the latch bars 38, and through apertures provided in the U-shaped bracket 36 and the retaining pin 34.

The notched lugs 31 fit into openings 42 in the horizontal flange of the angle bracket 32 and are locked in place by the latch bars 38 that enter the notches in the lugs 31.

When the retaining pin and U-shaped bracket are pushed forward, the latch bars 38 swing upon their intermediate pivots and release the notched lugs 31.

Figure 6:
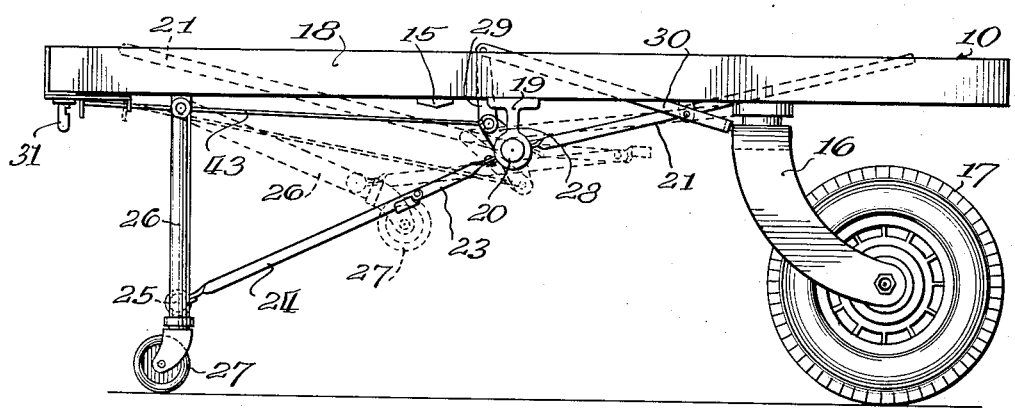
Fig. 6 is an elevation of the chassis.

In the operation of the illustrated device, the trailer is brought into proper position behind the vehicle, with the notched lugs 31 just over the openings 42, and the lever 21 is swung to its forward position. The movement of the lever causes the parts to move from the positions indicated by full lines in Fig. 6 to the positions indicated by dotted lines. As the control shaft 20 rotates in a counter-clockwise direction, the arms 23 swing toward the rear so that the frame 26 and wheels 27 are drawn up beneath the trailer body, and the front end of the chassis frame is allowed to drop upon the horizontal flange of the angle bracket 32 so that the notched lugs 31 enter the openings 42 and the latch bars snap into the notches. Simultaneously the crank 28 draws the link 29 downward so that the rear end of the pivoted yoke 30 is swung to its uppermost position, illustrated in dotted lines. The rear end of the pivoted yoke 30 is then against a circular portion at the upper end of the swiveled yoke 16.

When the trailer is to be detached from its vehicle, the lever 21 is swung to its rearward position. The crank 28 is thus swung upward, and the front end of a releasing rod 43 is pushed by the crank against the rear end of the retaining pin 34 so that the notched lugs are released. At the same time the front of the trailer is lifted clear of the angle bracket 32, as the frame 26 and wheels 27 move into supporting position, where they are firmly braced by the arms 23 and 24.

The rear end of the pivoted yoke 30 is swung downward in front of the square shoulder on the swiveled yoke 16, so that the road wheel 21 is locked against swiveling. Then, by reason of the locking effected by the pivoted yoke 30, the trailer is prevented from upsetting as it is moved about.

Figure 7:
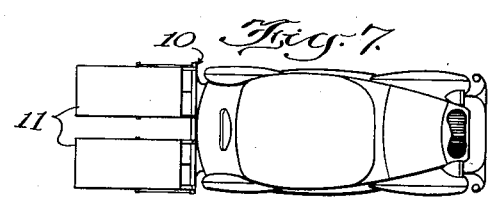
Fig. 7 is a plan of a passenger vehicle, with two of the trailers attached.

Fig. 7 shows a pair of the trailers attached to the rear of a passenger vehicle. When constructed as shown in the drawings, the trailers can pivot about a transverse horizontal axis at the rear of the vehicle, but are not permitted to swivel with respect to the vehicle. They may then be spaced apart to a sufficient extent so that the driver of the vehicle can use a rear vision mirror to see through the window of the vehicle and between the trailers. The use of a pair of trailers arranged side by side is especially advantageous when the vehicle and trailers are parked next to a high curb. The trailer nearest the curb is not tilted toward the curb nearly as much as a single wider trailer would be. Difficulty in opening the doors of the trailer as it stands next to the curb is thus obviated, and the semi-trailer can be built close to the ground level.

The openings 42 which receive the coupling lugs 31 are sufficiently oversize, and the coupling mechanism generally fits sufficiently loosely, to permit considerable upward and downward swinging of the rear of the main frame, as supported by the castered wheel, in reference to the traction bracket 32, to take care of the differences in elevation encountered in ordinary road conditions. In this way the coupling serves to hinge the trailer upon a transverse horizontal axis.

By my invention two independent trailers are so coupled to a tractor automobile that the assembly may be drawn or backed up about curves and otherwise maneuvered expeditiously—all within the complete control of the driver.

As compared with a single similar trailer of capacity equal to the combined capacities of my twin trailers, I divide the trailed loads into smaller units which ride up and down more or less independently of each other when their respective road wheels encounter bumps or holes in the road. The twin trailers impart the resulting jolts, such as lunges, side thrusts and the like to the automobile severally. Thus the jolts imparted to the automobile are of lesser magnitude than if the entire trailed load were to move together on a single such trailer. This makes for greater stability of the automobile. On rounding curves at high speed much of the tendency of the twin trailers to rock outwardly about their respective road wheels is resisted by the angle bracket 32 as a bending strain. With a single such trailer with an equivalent total load all this tendency to rock is applied as a rocking movement to the bracket 32 causing the automobile to rock much farther.

Attention is called to my copending application Serial No. 116,136 filed December 16, 1936, disclosing and claiming a material distribution system utilizing the twin trailers herein disclosed.

The specific construction that has been described may be modified, and various other devices embodying the substance of the invention may be devised to meet various requirements.

I claim:

1. The combination of a pleasure automobile having a pair of spaced coupling members occupying its rear bumper position and a semi-trailer for trailing attachment thereto comprising a main trailer frame, a road wheel castered thereon toward the rear of the main frame, a sub-frame pivoted on the main frame toward its front end and carrying wheels which, together with the road wheel, support the trailer when disconnected from the automobile, spaced coupling members carried at the forward end of the main frame for engaging the coupling members carried by the automobile, the coupling members being engaged by downward movement of the front end of the trailer frame upon the automobile carried coupling means, latching means locking the cooperating coupling members against accidental uncoupling vertical movement, a single manually engageable actuating member and means operatively connecting it with the sub-frame for swinging the sub-frame downwardly to engage its wheels with the ground and thereby lift the front end of the trailer to disconnect the coupling means by vertically separating them, and additional mechanism operatively connected to the actuating member for unlocking the latching means when the wheels are swung to their downward supporting position.

2. A trailer comprising a trailer body, a subframe mounted thereon carrying wheels for supporting the front of the body, means for moving the frame and its wheels into supporting position, means on the front end of the body for hooking downwardly upon a traction bar at the rear bumper position of an automotive vehicle for tractively mounting the front end of the trailer body, a latch for locking the hooking means to the traction bar, and unlatching mechanism actuated by said moving means for unlocking the latch when the frame and its wheels move into supporting position.

3. A trailer comprising a trailer body, supporting wheels for the front of the body, elevating and lowering means for moving the wheels between an upper position and a lower ground-engaging supporting position, a castered wheel for supporting the rear of the trailer body, a coupler for tractively mounting the front end of the trailer body upon a traction bar at the rear bumper position of a tractor automobile, latch means for locking the coupler, and unlatching mechanism operatively connected with the lowering means for unlocking the coupler when the supporting wheels are moved to their lower supporting position.

4. A multi-trailer goods transportation unit for highway use comprising an automobile and a plurality of individual load-carrying trailer vehicles having rearward road wheels and disposed in side-by-side laterally spaced-apart trailed relation behind the automobile and approximately within the rearward projection of the automobile, and means constructed and arranged detachably to couple together all said vehicles in said relation to permit their independent relative up and down movement, as determined by their respective road wheels, about transverse longitudinal axes but maintaining all the said vehicles laterally parallel with each other at all times while thus coupled together, whereby those movements of the trailed loads, in response to road shocks suffered by their respective road wheels, which are imparted to the automobile are imparted thereto severally and whereby the unit may be backed up under control of the driver of the automobile.

5. A three vehicle highway unit rearwardly maneuverable under full control of the driver, comprising an automobile of substantially standard passenger car width, a pair of twin load-carrying semi-trailers therefor each of substantially half or less the width of the automobile and each rearwardly carrying a castered road wheel, and cooperating mounting means on the front ends of the semi-trailers and on the automobile constructed and arranged for detachably connecting the semi-trailers in side-by-side laterally spaced-apart relation behind the automobile substantially within the rearward projection thereof to permit the rear of the trailers to move up and down in reference to the automobile and independently of each other but to prevent the semi-trailers swinging laterally in reference to the automobile.

6. A highway delivery unit comprising an automobile of substantially standard passenger car width, a pair of twin goods-carrying intra-building trucks each of about half or less the width of a standard automobile and each having a castered rear wheel and withdrawable front wheels rendering the trucks self supporting whereby they may be wheeled around individually by hand and through ordinary doorways, and means for coupling each of the two trucks, with their front wheels withdrawn, as semi-trailers to the rear of the automobile with their castered wheels serving as road wheels, the trucks being disposed one to one side and the other to the other side of the centerline of the automobile leaving a rear vision space therebetween for the driver, said means also holding each truck against lateral movement relative to the automobile but permitting the rear of each truck to move up and down relative to the automobile and to the other truck whereby road shocks suffered by the respective trucks and imparted to the automobile are imparted thereto independently, said coupling means individually detachably coupling the trucks to the automobile whereby selectively both trucks, or either truck without the other truck, may be trailed by the automobile.

7. A compound vehicle highway unit comprising an automotive road vehicle, a horizontal transverse bar fixedly carried by the automotive vehicle at its rear, a pair of twin semi-trailers disposed in spaced side-by-side relation behind the automotive vehicle and approximately within the rearward projection thereof, each semi-trailer rearwardly carrying a castered road wheel, and hinge-like means constructed and arranged for mounting the front of each semi-trailer upon the bar at points laterally spaced apart a distance equal to at least the greater part of the width of the semi-trailer to allow the rear of each semi-trailer to swing up and down independently of the automotive vehicle and of the other semi-trailer while preventing substantial movement of the front of each semi-trailer relative to the bar, said means holding the semi-trailers substantially parallel with each other and with the automotive vehicle and being so constituted that the rocking forces of the respective semi-trailers under centrifugal force in rounding curves are in part mutually balanced by their absorption by the bar as a bending strain thereon.

WILLIAM H. HEWITT.